United States Patent Office.

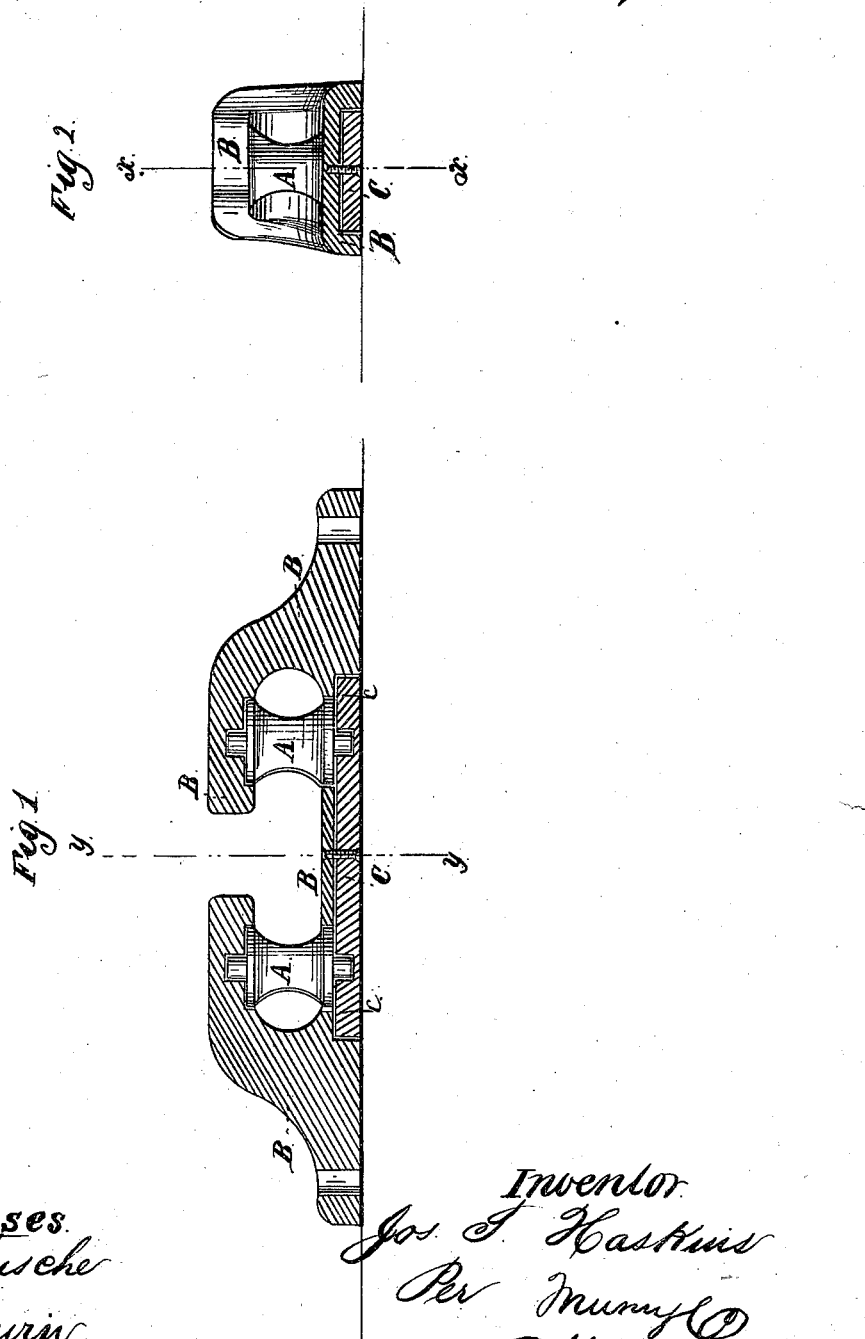

JOSEPH T. HASKINS, OF ROCKPORT, MASSACHUSETTS, ASSIGNOR TO HIMSELF AND E. ROWE, OF THE SAME PLACE.

Letters Patent No. 78,964, dated June 16, 1868.

---

IMPROVEMENT IN WARPING-CHUCKS.

---

The Schedule referred to in these Letters Patent and making part of the same.

---

TO ALL WHOM IT MAY CONCERN:

Be it known that I, JOSEPH T. HASKINS, of Rockport, in the county of Essex, and State of Massachusetts, have invented a new and improved Warping-Chuck; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved warping-chuck, taken through the line $x\ x$, fig. 2.

Figure 2 is a vertical cross-section of the same, taken through the line $y\ y$, fig. 1.

Similar letters of reference indicate like parts.

My invention has for its object to improve the construction of the common warping-chuck, so as to prevent the wearing or chafing of the warps or lines in warping a vessel, or when she is fastened to the wharf.

When the chuck is formed in the ordinary manner, the great friction of the rope upon it constantly wears the rope. When the vessel is fastened to the wharf, especially in rough weather, the constant sawing motion of the rope upon the jaws of the chuck, causes it to wear away very rapidly, so much so as to frequently make it necessary to cut and splice it.

To remedy this, I insert friction-rollers A in the jaws of the chuck B, to receive the friction of the rope. The upper and lower ends of the rollers A enter recesses in the jaws of the chuck B, so that the said ends may be below the surface of the said jaws, to prevent the rope or line, however small it may be, from getting between the end of the roller and the jaw of the chuck, and being cut or chafed. The upper journals of the rollers A enter and work in sockets formed in the said jaws, and the lower journals enter and work in sockets formed in the plate C, which fits into and is secured in a recess formed in the bottom of the chuck B for its reception, as shown in figs. 1 and 2. This construction enables the rollers to be passed up to their places through the bottom of the chuck, where they are secured in place by the plate C.

I claim as new, and desire to secure by Letters Patent—

The friction-rollers A, when inserted in the chuck by being passed through the bottom, and secured in place by the plate C, in combination with the recesses in the jaws of the chuck, and in the plate C, as herein shown and described.

JOSEPH T. HASKINS.

Witnesses:
ALFRED PARSONS,
WM. KNUTSFORD, Jr.